United States Patent [19]

Aberg

[11] Patent Number: 4,952,248

[45] Date of Patent: Aug. 28, 1990

[54] VEHICLE AND METHOD TO CHEMICALLY ASSIST HIGH GLOSS BUFFING AND CLEANING OF A WAXED SURFACE

[76] Inventor: Erik O. Aberg, P.O. Box 378, Solomons, Md. 20688

[21] Appl. No.: 384,078

[22] Filed: Jul. 24, 1989

Related U.S. Application Data

[63] Continuation of Ser. No. 170,112, Mar. 17, 1988, abandoned, which is a continuation of Ser. No. 923,276, Oct. 27, 1986, abandoned, which is a continuation-in-part of Ser. No. 858,817, May 2, 1986, abandoned.

[51] Int. Cl.$^5$ ................................................. B08B 3/08
[52] U.S. Cl. ..................................... 134/40; 134/25.4; 134/29; 252/174.21; 252/162; 252/153; 252/154
[58] Field of Search .................... 134/25.4, 29, 30, 40, 134/18, 6; 225/174.21, 162, 153

[56] References Cited

U.S. PATENT DOCUMENTS

| | | | |
|---|---|---|---|
| 3,463,735 | 8/1969 | Stonebecker | 282/137 |
| 4,135,828 | 2/1962 | Church | 252/153 |
| 4,213,873 | 7/1980 | Church | 252/174.21 |
| 4,315,828 | 2/1982 | Church | 252/174.21 |

*Primary Examiner*—Asok Pal
*Attorney, Agent, or Firm*—Ronald P. Kananen

[57] ABSTRACT

A method and apparatus for dry cleaning and shining vehicles, especially motor vehicles, but also other waxable surfaces. The method includes the steps of applying a solution of ammonia, water and alcohol to the surface of the vehicle or other waxable surface, toweling the surface to spread the applied solution, partially remove and evaporate to allow the alcohol to liquify or soften the wax on the surface preparatory to finish polishing. Specifically it is a chemical means for levelling the wax on the surface to the highest degree attainable replacing mechanical buffing which cannot perform at this high level. A preferred embodiment of the solution includes 1 ½ ounces of a commerically-available ammonia preparation, 10 ounces of water and 4 ounces of isopropyl alcohol. Alternatively, the solution includes 1 ½ ounces of ammonia with 6 ounces of water and 4 ounces of isoproyl alcohol (70% by volume), or mixtures within these ranges. The composition is preferably provided as part of a kit for the convenience of the user.

8 Claims, 1 Drawing Sheet

VEHICLE AND METHOD TO CHEMICALLY ASSIST HIGH GLOSS BUFFING AND CLEANING OF A WAXED SURFACE

This application is a continuation of application Ser. No. 170,112, filed Mar. 17, 1988. which is a continuation of application Ser. No. 923,276, filed 10/27/86, which is a continuation-in-part of the Applicant's prior copending application, Ser. No. 858,817, filed May 2, 1986, now all abandoned.

BACKGROUND OF THE INVENTION

This invention relates to a method and apparatus for dry cleaning and shining vehicles (and other waxable surfaces), but especially motor vehicles. More particularly, this invention relates to the use of a readily available commercial composition, improved according to the invention, for dry cleaning motor vehicles in combination with highly absorbent paper towels. Still more particularly, this invention relates to a kit for cleaning and shining motor vehicles and other waxable surfaces without need for external water. This invention also relates to an apparatus, composition and method whereby a solution completely free of wax content effectively permits levelling of a pre-existing wax surface that upon continued practice upgrades the gloss to the highest attainable standards.

It is conventional to clean a vehicle using soap and water, whether by hand or through the use of automated or semi-automated car wash installations. Such techniques are practiced both privately and commercially utilizing large volumes of water for rinsing the surface of the vehicle of an applied and accumulated detergent composition immersed in water. However, such techniques are unacceptable for a number of reasons.

First, washing with soap and water does not necessarily dissolve or remove all of the dirt and grime present on the surface of the vehicle. Some accumulation is petroleum-based, emerging on vehicle pathways through exhaust emissions, spillage, and wear of tires on surfaces. Such deposits are particularly miscible with water during a rain for deposit on the surface of the vehicle where it resists removal in a conventional soap and water washing process. A notable example of the deposit of petroleum-based products is the presence of tar or asphalt deposits from freshly-paved roads or roads which have been intensely heated environmentally. When such deposits are not completely removed from the surface, they are sooner or later waxed over by the application of a suitable car wax, thus progressively dulling the luster and the original brightness of the finish. When such dulling is compounded with the normal loss of luster of painted vehicular surfaces through fading, the original brightness of the finish is diminished.

A second shortcoming of soap and water washing of vehicles is that it presents a hazard to the vehicle finish. Rinsing an automobile with water does not generally completely remove the dust or grime. Thus, such dust and grime is removed by the use of a detergent-impregnated cloth, sponge or brush which are readily commercially available for this purpose. A substantial risk occurs to the surface of the vehicle using this questionable procedure since the loose grime which has been wetted is caused by the cloth, sponge or brush to be passed over the surface under pressure, possible resulting in abrasion of the surface finish. While soap and detergent may help alleviate this problem by acting as an emulsifier for some of the particles, wherein the particles can be flowed from the surface of the vehicle, such an approach is not completely satisfactory in protecting the surface.

Thirdly, soap and water are corrosive elements to the finish of the vehicle, resulting in a need for a fine film of wax to protect the surface.

Fourthly, the washing procedure in general use is ecologically wasteful, adding difficult-to-treat effluents to sewage systems and contaminants to the immediate area. An influx of substantial amounts of detergent-laden water into waste water systems significantly adds to the burdens of waste water removal by individuals and communities. Thus, it would be desirable to develop a cleaning system which eliminates the use of substantial amounts of water and facilitates disposal of by-products from the automotive cleaning process.

Fifthly, the present need for copious quantities of water confines the washing process to locations where such water is available and its disposal convenient. It would be convenient, therefore, if a car could be "dry-cleaned," i.e., cleaned without the need for external water at convenient locations such as parking garages, while stored, or while waiting for other purposes.

Finally, the processes known generally require separate washing, drying, waxing and polishing steps. It would be advantageous to combine all or most of these operations into a single procedure.

Thus, it is an overall objective of this invention to provide a quick, inexpensive, and easy to use method and apparatus to clean properly vehicle surfaces while providing a continuing maintenance and upgrading of the polished surface.

It is another objective of this invention to provide a kit for cleaning a vehicle which is utilizable without need for soap and water at remote locations at the convenience of the user.

It is another objective of this invention to provide a method and apparatus for cleaning a vehicle surface which preserves and upgrades the luster and original brightness of the vehicle finish, while removing petroleum-based road grime.

It is further an objective of this invention to provide very highly glossed surfaces that effectively resist abrasion, dirt, grime and petroleum products; by providing such a glossed surface, it becomes easier to more efficiently remove these reduced but objectional products or residues.

It is also an objective of this invention to provide a composition, method and apparatus to clean and effectively produce an improved gloss on all waxable surfaces such as appliances, counter tops, fiberglass products, glazed surfaces such as tile and glazed pottery, plastics, aluminum, steel and stainless steel, chrome and glass, including mirrors, where clarity and brightness are important factors.

It is an additional object of this invention to provide a method and apparatus for removal of surface grime, by avoiding washing with soap and water, while effectively removing petroleum-based grime and eliminating hazards to the surface of the vehicle.

It is a further object of this invention to provide a method and apparatus for removing petroleum-based grime from the surface of a vehicle while dissolving the grime and absorbing the dissolved grime in highly absorbent paper toweling, while avoiding the corrosive effect of water on the surface of the vehicle and especially in those areas which have been nicked by stones or rocks, exposing the metallic underlayer.

These and other objects of the invention will become apparent from a review of the written description which follows, taken in conjunction with the accompanying drawings.

BRIEF SUMMARY OF THE INVENTION

Directed to achieving the foregoing objects and overcoming the problems involved with soap and water washing of vehicles, this invention relates to a method and apparatus for dry cleaning and shining a surface of a vehicle. The method includes the steps of providing a mixture of effective amounts of ammonia, water, and alcohol; applying the mixture in minute quantities to the surface of a vehicle; toweling and buffing the wet surface of the vehicle with a highly absorbent paper towel; the alcohol residuals providing a softening effect on the waxed surface while the rapid buffing action of the towel effectively levels the wax on the surface while the paper towel absorbs the water/ammonia mixture and grime and the alcohol flashes from the surface. Repeated application of this method improves the gloss of the surface wax and ultimately attains a maximum gloss permitted by the surface underneath.

The mixture preferably comprises a solution of 1½ ounces of ammonia to 10 ounces of water and 4 ounces of isopropyl alcohol (70% by volume) (a 3:8:20 mixture), wherein the alcohol assists in dissolving and releasing petroleum products and in the cleaning process. For use on interior surfaces such as floors, where the ambient temperature is generally lower, the amount of water can be reduced to increase the volatility of the solution. Thus, a suitable mixture is in a ratio of 1½ ounces of ammonia to 4 ounces of alcohol to 8 ounces of water, (a 3:8:16 mixture) or in proportions of alcohol and ammonia within the range.

For dense high polish surfaces such as mirrors, plastics, brass, chrome, etc. a suitable mixture is in a ratio of 1/1–2 ounces ammonia to 4 ounces isopropyl alcohol (70% by volume) and 6 ounces of water (a 3:8:12 mixture) where the increase in volatility and chemical strength produce a fast acting cleaner and polisher with exceptional results In particular, the alcohol and ammonia deposits on the waxed surface soften the wax and permit the buffing action to level the pre-existing wax, further improving the gloss.

The mixture without wax is applied to an existing waxed surface and cleans and levels the wax, thus improving the appearance and gloss on the surface. The waxed mixture is also used on surfaces that previously had not been waxed. Thus, the cleaning and upgrading of the gloss improves the resistance to dirt and grime, thus reducing the need and extent of the residues present on the vehicle effectively.

The apparatus for practicing the invention is preferably provided in kit form to include either a premixed or concentrated solution of the type described in a container having a sprayer for applying the solution; a supply of highly absorbent paper towels for removing the mixture from the surface, and buffing the wax haze produced.

These and other objects will become clear from the written description which follows.

DETAILED DESCRIPTION OF THE PREFERRED EMBODIMENTS

Figure 1:
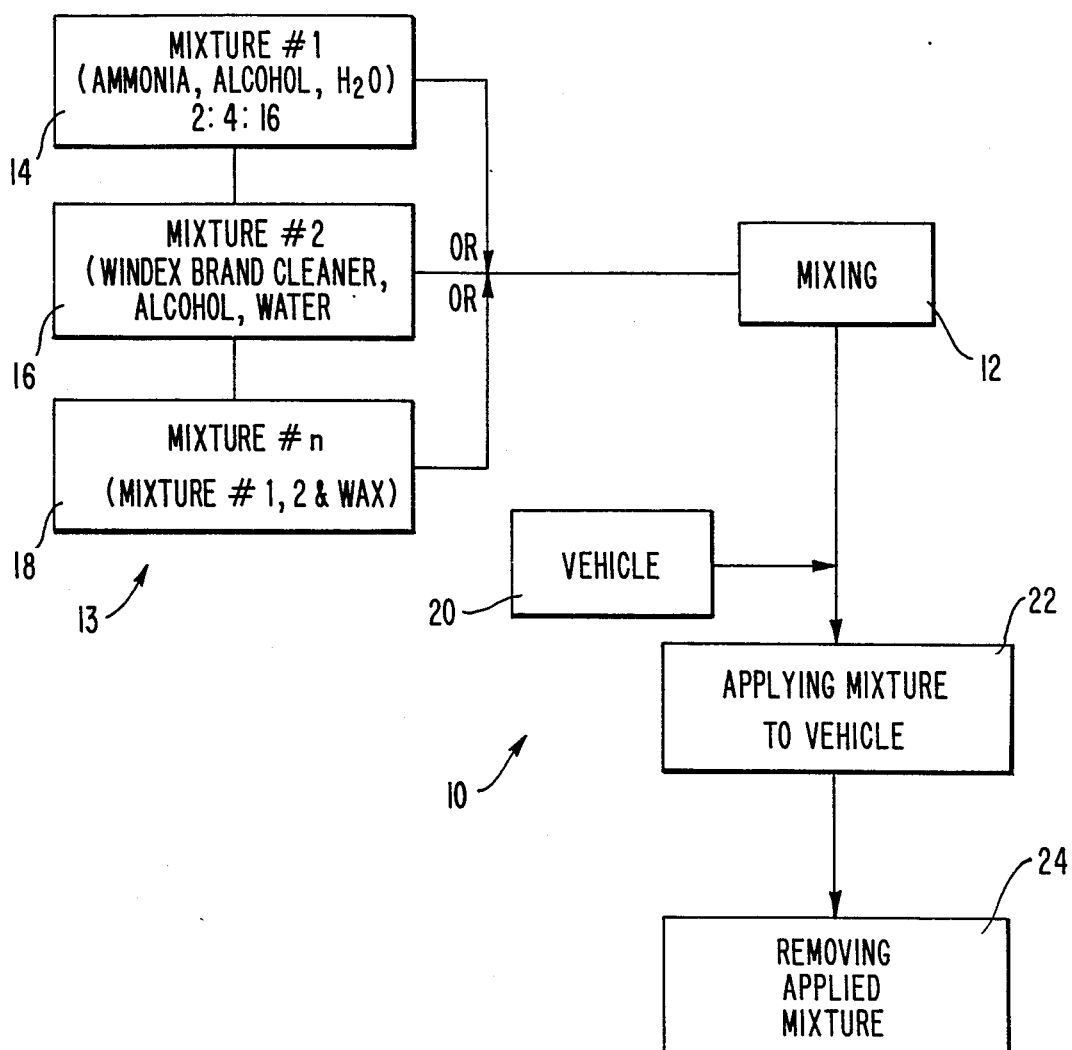
FIG. 1 is a block diagrammatic illustration of the various steps of the process according to the invention.
Figure 2:
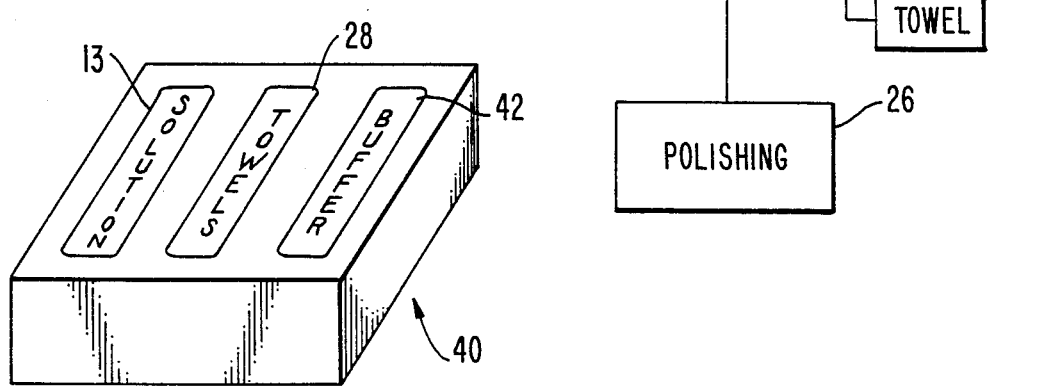
FIG. 2 is a diagrammatic sketch of a kit useful in practicing the invention.

The process according to the invention is shown in FIG. 1 and designated generally by the reference numeral 10. The process includes the steps of mixing a mixture 14 in step 12 which comprises any one of the mixtures shown generally by the designations "Mixture #1," "Mixture #2," or "Mixture #3" in blocks 14, 16, and 18. Preferred and representative mixtures for practicing the invention will be discussed later in this specification. The mixture 14 or 16 is applied to a vehicle 20 in an applying step 22. The mixture 14 so applied to the vehicle 20 is partially removed and the alcohol partly evaporated in step 24 of removing by a suitable removal device, a representative removal device being designated generally by the block 28. Following the step 24 of removing the applied mixture 14 or 16 from the surface of the vehicle 20, the surface is polished in a polishing step 26.

The selection of solutions 14 and 16 are choices where the mixture 16 is used during very cold weather and the mixture 14 is during warmer periods. Solution 16 can be used effectively as a general cleaner and polisher in the household but also can substitute for use on vehicles during colder weather.

In the step of removing the applied liquid, it is wiped over the area in quick succession to take advantage of the alcohol and ammonia present and in the state of evaporating. This wiping or buffing action smooths the "hills" in the wax formation because the alcohol has softened and partially liquified the wax on the surface. In the final action of polishing the wax haze with a dry paper towel pad, the action is completed. Wax on the surface even if liquified by the alcohol remains on the surface because the towel is wet with water, the two no longer being saponified in the solution.

A suitable mixture having the essential components for performing the process as representatively shown as Mixture #1 in block 14 is a mixture of 1½ ounces of ammonia and 10 ounces of water and 4 ounces of isopropyl alcohol (70% by volume) to which may be optionally added a suitable quantity of a surface wax to the vehicle, such as commercial wax, the solution being an excellent dispersant. This proposed mixture varies from a typical mixture of ammonia and water for general cleaning purposes such as called for in the commercial grade PARSONS ammonia of 4 ounces of ammonia per gallon of water. Thus, the ammonia content of the applicant's solution is substantially increased over a typical commercial recommendation. Such an increased concentration of ammonia, in combination with alcohol, has proved suitable for removal of a major contaminant of deposits on automotive body surfaces caused by petroleum-based products such as oils, asphalts, rubber, and vehicle emission products. As is known, rotating wheels of vehicles, for example, throw these products into the turbulent stream of air surrounding the vehicle on a roadway and dirt products containing such quantities of ground petroleum products are themselves deposited in a film which accumulates on the surface of a vehicle. The presence of alcohol not only serves to assist in dissolving the accumulated and deposited petroleum products, it also inhibits freezing if the mixture, for example, in kit form, is stored in a below-freezing atmosphere. The alcohol, it has been observed, serves mainly to soften or liquify the wax present on the surface thus releasing any contaminants from the wax for removal, and also allows levelling of the wax to improve its glossy appearance.

Mixture 18 (#3) is a highly volatile solution that is particularly succesful in cleaning and polishing brass, chrome, glass, and mirrors and all dense, hard surfaces. Too volatile for vehicles, it is an instant polisher of all waxed surfaces and quickly disperses soap curd. Its increased volatility does not allow the cleaning capabilities as good as Mixture 16 (#2).

The application of a mixture without added wax has proved suitable for application to a waxed surface, wherein the wax already present on the surface is smoothed and evened by the process. This application can be repeated many times with successive improvements in the luster until a highest degree of luster is attained. The mixture which contains a wax is suited for both waxed and unwaxed surfaces to achieve a maximum luster.

The mixture described above is applied to the surface of the vehicle or other waxable surfaces in the step designated by the reference numeral 22. Preferably, the mixture is sprayed onto a limited area of the entire surface of the vehicle or other waxable surface in a fine mist such as by a commercially-available spray pump and the surface is thereafter wiped dry in the removing step 24 by using a trifold of three highly absorbent paper towels, forming a pad. By these steps 22 and 24, dirt and particles and wetted dissolved oily products are readily released and captured by the toweling and do not mar the surface, contrary to expectations. Visual observation of the products accumulated by a general application of a mixture to a vehicle surface over a period of fifteen months has shown no observable abrasion occurring in the practice of the process. The application of the solution so described, without added wax visually appears to rejuvenate the existing wax surface on a vehicle while at the same time cleaning the surface. Visual observation of the paper towel pad used to remove the solution from the vehicle surface indicate blackened deposit areas on the towel, thus evidencing petroleum-based deposits.

The step of removing is preferably followed by the step of polishing and levelling the wax. Preferably, polishing consists of using a clean, dry, paper towel pad with a wiping action promptly after the liquid has evaporated and the surface wax appears hazy. This is the final buffing to the finish and results in an improved luster because of the levelling action. Successive applications will improve the luster on each step to a point of perfection as allowed by the surface imperfections beneath the wax.

It should be considered that "scratching" of the waxed surface caused by grit being drawn across the surface by handpower is actually in the form of abrasive marks induced on the waxed surface. The momentary liquification of that wax by the mixture according to the invention and excited by the wiping motion deters the incidence of abrasion of the wax surface because of the lubricity and the reposturing of the wax filling new voids instantly.

The application of the process shown in FIG. 1 for a compact car with an otherwise well-maintained finish requires about five minutes to completely dry clean and polish using the process with about ⅛ of an ounce or less of solution and the use of about two highly absorbent 2-ply paper towels pads. Thus, significant cost savings occur, while proving convenient in practicing the procedure.

The application also improves the surface of the vehicle to a point where one finds that the usual dirt, grime and dust are greatly diminished therefore speeding up the process of cleaning. In one test, it only required less than four minutes to complete with a total expenditure of ¼ ounce of liquid.

Another aspect of the invention relates to a provision of a mixture produced in accordance with the mixing step 12 shown in FIG. 1, in a kit designated generally by the reference numeral 40. The kit 40 includes the solution 14 or 16, and a supply of paper towel pads 28 and 42, in a convenient carrying case. The kit 40, within the confines of a small space, provides all of the ingredients necessary for a vehicle owner or user to dry clean and polish a vehicle at a site convenient to him. For example, the vehicle could be cleaned and polished in a matter of minutes while waiting at a parking lot for a spouse, while pinned in traffic, or attended to commercially as an adjunct to commercial parking lots for a nominal fee. The cost of the ingredients is nominal, while the procedure is ecologically sound in that the residue of paper towels is easily incinerated.

As representative examples of the mixtures produced according to the invention, the following are provided:

EXAMPLE 1

1½ ounces of commercially available ammonia, available under the PARSONS brand name, were mixed with 4 ounces of isopropyl alcohol (70% by volume) and 10 ounces of water. Such a solution contained twice the recommended content of the ammonia mixture commercially available as a starting solution, which the manufacturer recommended as 1 ounce per quart of water. Such a solution was applied by spraying in accordance with the teachings of this invention and by a highly absorbent paper towel pad, commercially available under the brand name BOUNTY, a highly absorbent pad of three 2-ply, 11"×11" paper towels. The mixture was applied by a commercially available spray mist bottle, such as that utilized for the application of WINDEX brand cleaner in controlled amounts, wherein the application varied in accordance with the quantity of residue to be removed. For example, heavier deposits of petroleum-based grime near the base of the vehicle and near the wheel wells required the application of greater quantities or repeated applications. Such a solution was applied to a HONDA brand compact automobile by applying about ⅛ ounce of the solution so mixed spread over the entire surface of the vehicle.

The mixture was removed by evaporation and highly absorbent paper towels, such as BOUNTY 11"×11" 2-ply towels. Visual examination of the towels which were used by applying a clean area often during the absorbing process revealed blackened dissolved deposits while the surface so cleaned revealed an absence of petroleum-based grime, even under microscopic visual examination. Thus, it is believed that the petroleum-based grime released and absorbed by the mixture, made possible by the alcohol and ammonia to form a solution which is readily picked up by the towel pads.

The mixture was applied without the addition of wax to the mixture in accordance with Mixture #1 described above since the compact automobile had been waxed regularly for the prior 9 months. The mixture was applied not only to the painted surface but also to mirrors, wheels, bumpers, and glass surfaces in a period of about 10 minutes. Visual examination of the surface revealed an extraordinarily good luster and preservation of the surface, an apparent smoothing of the waxed surface, and an attractive shine.

EXAMPLE 2

1½ ounces of commercially available ammonia, available under the PARSONS brand name, were added to 4 ounces of alcohol (70% by volume) and 10 ounces of water. The alcohol was isopropyl alcohol, normally used as rubbing alcohol. This alcohol provided an improved product for exposure and evaporation rate, while satisfactorily achieving a high gloss to the surface. This ratio naturally shortened the time required to polish the wax because the alcohol evaporated faster while the water dried more quickly.

The following discussion is helpful in understanding a possible explanation for the unexpected results of the invention. Theoretical aspects of gloss and polishing involve the reflection of light. With a mirror having a ratio of reflection of unity, it is known that in actual practice even with the most perfect optical mirror, the reflectance will be a fraction smaller than one. Optimum reflections ca only be achieved if the surface is smooth, even and free from scratches, otherwise the incident light will be reflected at irregular angles. Polishing then is employed to provide s reflecting, glossy surface.

Polishes are designed to yield a smooth surface by forming a film upon the surface. A shoe, for example, is covered with a film based on the wax which the shoe polish contains. The wax film fills the scratches and equalizes the unevenness, thereby providing a reflecting surface. With auto polishes, a combined cleaning and polishing effect is obtained: first, the dirt and grime are removed by the cleaning action of the polish (enhanced in most cases by the presence of soaps and other detergents, mild abrasives and by solvents); second, after the film is intensified by "buffing" with a soft brush and cloth.

By mechanical buffing, a different effect is obtained. Here the polishing effect is obtained chiefly by the action of abrasives contained in the wax compound. It is not only the cleaning effect of the abrasives which gives a glossy surface to metal or plastics, but also the heat of friction on the surface of the material being polished. This friction melts a thin microlayer to provide a plastic flow of wax on the surface. This molten material closes and fills all scratches and pores and materially levels the wax surface and on cooling gives the high gloss surface film of "buffed" or polishes metals and plastics.

The classic work of polishing by Sir George Beilby shows that the top layer of the polished solid is different in structure from that of underlying layers. The upper layer has lost its obvious crystalline properties and has apparently flowed over the surface bridging the chasms and filling the irregularities in it. The mechanism of the process has been the subject of discussion by the experts for many years. Newton, Herschel and others considered that polishing was essentially due to abrasion, that is, to gradual wearing away of the surface irregularities; in Beilby's view, it was due to some surface tension effect. However, the frictional heat generated at the rubbing surfaces may easily raise the temperature to a high level, and this suggests that the local heat-softening or actual melting may play an important part in the polishing process.

The surface film formed by plastic flow during polishing is generally of a very thin micro-structure. To summarize the effect of polishing, the smooth surface is obtained either by material from the polishes, e.g., the wax film formed by the material contained in the polishing compound, as in the case of shoe polish, or by a layer of the polished material itself which is formed by the frictional heat generated during polishing. Sometimes combined effects are obtained, e.g., film formation of the polished material and film formation by the wax base of the polishing material. This is sometimes the case with metal polishes containing abrasives and "high gloss" waxes.

Carnauba wax contributes greater hardness and solidity to wax compositions to which it has been added. In this way, beeswax, for example, loses its characteristic stickiness when a little Carnauba wax is added to it, and the new mixture offers greater resistance to kneading in the warm hand. On milling the Carnauba wax with paraffin wax, the later loses its crystalline structure in the same way that beeswax and Japan wax lose their conchoidal fracture.

The hardness and gloss of Carnauba wax render it particularly suitable for application in wax foundations in polishing preparations. Carnauba wax can also be worked up with water free creams as well as with water-containing emulsified products. Alone, or preferably in mixtures with easily saponifiable waxes and fats, it can fairly well be saponified, as it contains about 45% of saponifiable matter. By treatment with alkalis, emulsions of varying density result according to the quality of water added. Useful emulsions can be achieved simply by boiling the Carnauba wax with soap solutions.

A typical formula recommended in a Carbide & Carbon Chemicals Co. publication are typical of automobile polishes:

|  | Liquid | Semi-Solid |
| --- | --- | --- |
| Carnauba wax | 10 | 12 |
| Beeswax | 6 | 4 |
| Paraffin wax | 2 | 6 |
| Stearic Acid | 7 | 7 |
| Triethanolamine | — | 2.7 |
| Morphalene | 1.7 | — |
| Water | 75 | 50 |
| White Spirit | 75 | 50 |

The formula can be adjusted by less water/solvent for a more paste-like consistency. Since most polishes contain abrasives such as bentonite, tripoli, kieslguhr, diatomite, fullers earth, china clay, talc, and so forth, these abrasives provide the means to abrade the surface to remove dirt and grime, such as that appears on the cloth used for this task. The action "cleans" the surface leaving some of the grime in the residue on the surface which is picked up by the cloth. This action also levels the wax surface forcibly while the solvents may aid in the placement of new wax on the surface. It is apparent that the wax/water/soap/solvent emulsion (with other constituents) is a self-serving composition designed to work in the application scenario and specifically performs in this limited area.

Some of these above observations are those expressed in "Polishes," available from CRC Press. The author of this book failed to point out also that Carnauba wax also raises the melting point of other waxes by seeding this capability wherein these mixtures multiply the melting point not commensurate with the addition of Carnauba.

Dura Commodities Corporation, a leading importer of Carnauba wax, publishes a technical data sheet that states that Carnauba wax is soluble in boiling alcohol but is sparingly soluble in alcohol at ambient temperatures. The authors of "Polishes" point out that "pure carnauba is soluble in alcohol (boiling)." On cooling, white crystalline precipitate separates out. Carnauba wax is easily soluble in all solvents generally used in polishing waxes. With this information, the following test was also conducted.

EXAMPLE III (Testing Carnauba Wax)

A sample packet of Carnauba wax was obtained in natural form from Dura for testing purposes. Since it appeared apparent that the plain 3:8:20 mixture described above does not deplete the wax deposited on a surface (even when the wax free solution was used fifty times on a refrigerator door without any noticeable depletion of the wax with a great, successive improvement in the gloss attained), a test procedure was performed to reproduce a cleaning and polishing action on a flake of pure Carnauba (severest test of all waxes) for 52 successive applications in order to simulate conditions had one applied this treatment for a period of one year at a rate of once a week. Before application, the flake was weighed and on completion, weighed again to determine if losses occurred. This does not, however, take into consideration any oxidation losses. This test also was conducted to prove that the alcohol in the solution at ambient temperature fluidizes the microlayer, thus permitting levelling of the wax and thereby improving gloss and simultaneously allowing "dry cleaning" of the existing wax deposits on this micro-layer.

The sample flake of Carnauba wax was weighed at an apothecary by a pharmacist and found to weigh 454 milligrams. The sample was then subjected to cleaning and polishing operations 52 times in succession. The flake when weighed at first had a dull yellow appearance with no signs of gloss at all. A flake when wetted with the 3:8:20 solution and allowed to evaporate from the surface of the flake revealed a change in the surface that had signs of gloss. Rubbing this surface with a clean, dry paper towel immediately produced a high gloss. However, on rubbing the surface of the flake that was not treated with a towel, an immediate gloss also appeared. These two tests indicate that Carnauba is readily susceptible to rubbing and polishing actions.

Repeated applications of the above solution to the test sample improved the gloss until it was very slippery and difficult to properly rub. This indicated that the solution (alcohol) was fluidizing the microlayer and it appeared that this fluidized layer remained to be polished with a dry towel.

During the test run, six pieces of wax from the flake fractured away from the flake. All of the pieces were gathered upon completion of the test and weighed on the same scale and by the same pharmacist. The result was a residue of 430 milligrams, a difference of 24 milligrams from the starting amount. This indicated an approximate 10 milligram loss per each flat face taking into account the $\frac{1}{8}''$ thickness. It was noted that the paper towel contained many minute particles of wax that had separated from the larger piece. Thus, the test is not completely valid but graphically indicated that there is no appreciable loss of wax. The flake had an area of $\frac{1}{2}''$ square. Another test performed some time ago using full strength alcohol on a waxed surface revealed that the wax would be depleted on rubbing with a paper towel to the extent that 12 applications of wax were promptly removed. Therefore, there is a delicate balance that was achieved in this solution.

The combination, then, of rubbing and polishing a wetted waxed surface which this specific solution produces on the vehicle fluidizes the thin microlayer of the existing wax, i.e., that already on the surface and that being applied with the solution if so formulated, thus performing a chemically assisted buffing operation to achieve high gloss. The "buffing" herein is hand rubbing with moderate pressure on highly absorbent paper toweling. Performed quickly using the 3:8:20 solution, it smooths out the microlayer by means of fluidizing it (rather than melting or abrading it) making for an exemplary means to achieve a high gloss state with very little effort and with a drastic reduction in time. The utter slipperiness of the sample on being wetted and its resistance on drying further indicate the fluidizing action. It is also evident from testing using one's finger to apply the solution. Upon evaporating, the surface suddenly loses its slipperiness. Upon wiping with a dry towel, the slipperiness is restored to the dry surface, but not to the great degree of the wetted surface. It is more than evident from the action witnessed and as described in the work "Polishes" that the emulsion serves to clean the fluidized wax by means of the ammonia/water phase incorporated in the solution, the grime then being absorbed by the paper towel. This is confirmed since an '84 Honda after repeated uses of the solution became cleaner, taking on a bright (like new) appearance.

Fluidizing of the microlayer also promotes a great reduction in effort and the fast evaporation of the alcohol reduces reaction time to such a short duration that one can dry clean and high polish a compact car in less than four minutes. Here one has also to take into consideration that the microlayer is a very fine hardly discernable layer, thus the reduction in mass to be polished of major importance in the time and effort saving step.

The solution acts as a excellent dispersing vehicle for waxes. Misted on the surface and wax rubbed into the solution produces an excellent way to apply wax in an ultra-thin layer, saving labor and material while maintaining a low profile on an already improved surface.

The polish just described would be used for a period of time on a new surface to build an effective wax coating and chemically buffing it to a fine gloss. Later application of the unwaxed solution (3:8:20) would serve to maintain a clean waxed surface and to improve the gloss on subsequent applications.

This is opposed to the accepted and commercially available waxes that cannot hope to remove all the grime and dirt not to mention the almost useless washing with soap and water. In fact, the car surface has very fine accumulations of grime that become imbedded in the wax surface and characteristically dull the surface. The fact that the test car when new was subjected to one year of washing with soap and water had a noticeable brightening effect after numerous applications of the 3:8:20 solution is further evidence of the removal of color bodies that became encapsulated in the wax on the surface. Thus, this solution is seen as an excellent means of maintaining and improving waxed surfaces and imparting bright colors lost to improper care.

Thus, it has been demonstrated that in order to clean and fine polish a waxed surface that a simple cleaning compound (household ammonia) in water in the presence of alcohol can and does promote the release of dirt, grime, and other contaminants by actively fluidizing the microlayer. These contaminants then freed in the liquid phase are readily captured in the high absorbing paper toweling. The resistance to wax absorption by the paper towel is evidently due to the water/ammonia phase that has been absorbed in the fibers of towel. The alcohol in the fluidized zone evaporated leaving a cleaned waxed surface that is finish polished with several passes of a dry towel during the tail end of the evaporation process.

EXAMPLE IV

The effective amounts of alcohol, water, and ammonia can also be adjusted within the teachings of this invention to accommodate the ambient temperature where the solution of the invention is used. When prepared for a floor or other interior surface, the amount of water was reduced to produce a more volatile solution. Thus, for interior surfaces at lower ambients, the ratio was 1½ ounces of ammonia to 4 ounces of alcohol to 8 ounces of water. The results were satisfactory.

It is also noted that the 3:8:12 mixture (No. 3) is a very volatile solution that expressly works well on dense surfaces as shown in step 18 in FIG. 1 and specifically polished metals, sinks, chrome, glass and mirrors while being an excellent soap curd disperser. In this case, the adjustment of the constituents are within the teachings of this invention to accomodate special surface conditions.

Since the aforementioned procedures succeed in restoring the wax finish on old cars and will maintain a new car with no build-up of haze coupled to the gradual improvement in glass with its attendant improvement in the wax profile to a dense, flat and smooth surface, it is probable that this continued process will ultimately delay or postpone the oxidation process respecting the underlying paint. It is not known how many years or decades are involved at this time. If the painted surface cannot "see" oxygen, then the process could be totally prevented by the continued upgrading of the wax overlay.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A method of chemically assisting high gloss buffing and cleaning pre-existing wax on a waxed surface thus improving the luster of a waxable surface without need for external water or wax, comprising the steps of:
   providing a mixture consisting of effective amounts of ammonia, water, and alcohol;
   momentarily fluidizing the wax at the microsurface of the waxed surface by applying the mixture in minute quantities to a limited portion of the waxed surface of waxable surface;
   spreading said mixture and wiping the spread mixture from a limited portion of the surface of vehicle or other waxable surface rapidly with a highly absorbent paper towel pad to absorb grime released from said waxed surface during the fluidizing step; and
   completing a polishing step with a clean dry paper towel pad once the surface wax produces a dry haze as fluidized wax resolidifies.

2. The method as set forth in claim 1, where the step of providing includes the step of providing a solution in the ratio of 1½ ounces of ammonia to 6 to 10 ounces of water to 4 ounces of isopropyl alcohol (70% by volume).

3. The method as set forth in claim 1, wherein about ⅓ ounce of said mixture is misted upon the surface of a typical subcompact vehicle.

4. The method as set forth in claim 1, wherein the spreading and wiping step is performed utilizing a plurality of highly-absorbent, two-ply, 11"×11" paper towel pads.

5. The method as set forth in claim 1, wherein the completion of a polishing step is performed using a new, clean and dry paper towel pad.

6. The method set forth in claim 1 wherein the mixtures are used as a dispersing solution in applying new wax to a surface, such action making possible a super thin layer of wax easily polished out, reducing labor, materials and helping to maintain the smoothness trained into the surface wax existing.

7. A method for dry cleaning and shining vehicles having a waxed surface by chemically assisting high gloss buffing and cleaning of pre-existing wax on said waxed surface to improve the luster of the vehicle without need for external water or wax, comprising the steps of:
   providing a mixture consisting of a solution of ammonia, alcohol, and water in a ratio of about 3:8:20 to about 3:8:12 to said waxed surface of said vehicle;
   momentarily fluidizing the wax at the microsurface of the waxed surface of said vehicle by applying the mixture as set forth in the providing step in minute quantities to a limited portion of the waxed surface of said vehicle, in accordance with the quantity of residue and grime to be removed from said waxed surface;
   spreading said mixture and wiping the spread mixture from a limited portion of the surface of said vehicle rapidly with a highly-absorbent paper towel pad to absorb residue and grime released from said waxed surface during the fluidizing step, so that said pad absorbs petroleum-based grime released by said mixture at it fluidizes the surface of said waxed surface; and
   completing a polishing step with a clean dry paper towel pad once the surface wax produces a dry haze as fluidized wax resolidifies without the presence of said petroleum-based grime thus released, whereby said surfaces possesses a good luster, an attractive shine, and an apparent smoothing of the waxed surface.

8. The method as set forth in claim 7, wherein said mixture includes isopropyl alcohol whereby said polishing step is shortened as the isopropyl alcohol evaporates rapidly to hasten a resolidification of said fluidized waxed.

* * * * *